(12) United States Patent
Zhang et al.

(10) Patent No.: US 8,817,504 B2
(45) Date of Patent: Aug. 26, 2014

(54) MULTILEVEL CONVERTER AND TOPOLOGY METHOD THEREOF

(75) Inventors: Di Zhang, Schenectady, NY (US); Luis José Garcés Rivera, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 248 days.

(21) Appl. No.: 13/407,875

(22) Filed: Feb. 29, 2012

(65) Prior Publication Data

US 2013/0221678 A1 Aug. 29, 2013

(51) Int. Cl.
*H02M 7/48* (2006.01)

(52) U.S. Cl.
USPC .......................................................... 363/71

(58) Field of Classification Search
USPC ............................................. 363/65, 71, 131
See application file for complete search history.

(56) References Cited

U.S. PATENT DOCUMENTS

| | | | |
|---|---|---|---|
| 5,625,545 | A | 4/1997 | Hammond |
| 6,005,788 | A | 12/1999 | Lipo et al. |
| 6,072,707 | A | 6/2000 | Hochgraf |
| 7,405,498 | B2 | 7/2008 | Rastogi et al. |
| 8,228,695 | B2 * | 7/2012 | Roesner et al. ............ 363/56.01 |
| 2009/0008996 | A1 | 1/2009 | Gentillet et al. |
| 2009/0080225 | A1 | 3/2009 | Dijkhuizen |
| 2010/0052561 | A1 * | 3/2010 | Luerkens ...................... 315/291 |
| 2011/0103115 | A1 | 5/2011 | Jacobson et al. |
| 2011/0260545 | A1 | 10/2011 | Asplund |
| 2011/0280052 | A1 | 11/2011 | Al-Haddad et al. |

FOREIGN PATENT DOCUMENTS

| | | |
|---|---|---|
| EP | 2178200 A1 | 4/2010 |
| WO | 2010051645 A1 | 5/2010 |
| WO | 2010078999 A1 | 7/2010 |
| WO | 2010122083 A1 | 10/2010 |

OTHER PUBLICATIONS

Adam et. al, "Network Fault Tolerant Voltage-Source-Converters for High-Voltage Applications", AC and DC Power Transmission, 2010. ACDC. 9th IET International Conference, pp. 1-5, Issue Date: Oct. 19-21, 2010.

Corzine, "Operation and Design of Multilevel Inverters", Developed for Office of Naval Research, pp. 1-79, Dec. 2003, Revised Jun. 2005.

Khomfoi et. al, "Chapter 31 Multilevel Power Converters", The University of Tennessee, pp. 31-1-31-50.

* cited by examiner

*Primary Examiner* — Adolf Berhane
*Assistant Examiner* — Yemane Mehari
(74) *Attorney, Agent, or Firm* — Ann M. Agosti (57) ABSTRACT

A multilevel converter includes at least one phase each including several cascaded basic units each including a first switching element, a second switching element, and a separate and electrically isolated DC source (SDCS). The SDCS is electrically coupled between the first switching element and the second switching element in each basic unit. Each of the adjacent pairs of the basic units are electrically crosswise coupled together by electrical coupling of the first switching element of a first basic unit of the two adjacent basic units to the second switching element of a second basic unit of the two adjacent basic units, and electrically coupling the second switching element of the first basic unit to the first switching element of the second basic unit.

13 Claims, 7 Drawing Sheets

MULTILEVEL CONVERTER AND TOPOLOGY METHOD THEREOF

BACKGROUND

The described embodiments relate generally to the field of conversion of direct current (DC) to alternating current (AC) and vice versa, and more specifically, relate to converters (inverters and rectifiers) that are multilevel.

Such power conversion equipment is particularly useful for renewable power generation systems such as wind and solar power generation systems. Generally a wind turbine includes a rotor that includes a rotatable hub assembly having multiple blades that transform wind energy into a mechanical rotational torque that drives one or more generators via the rotor. With the rapid growth of grid-connected renewable power generation systems, renewable power penetration into the power grid may have a significant impact on the grid voltage and frequency. It is desirable to regulate the voltage and frequency of the AC power at the output of the power generation system. In wind turbine embodiments, one or more power converters are coupled to the generator to convert the power to provide power with an appropriate frequency and voltage for the utility grid.

Figure 1:
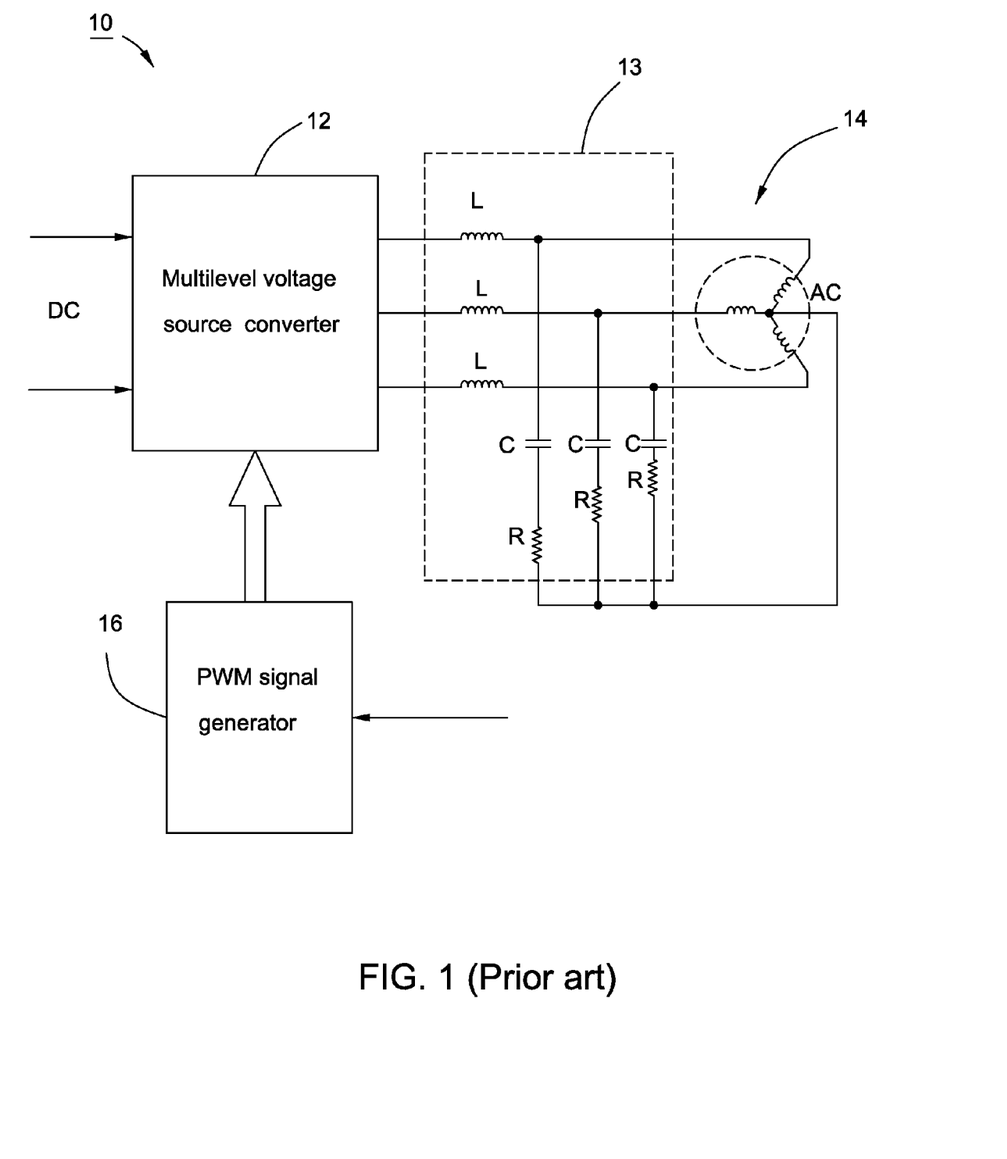
FIG. 1 is a schematic circuit diagram of a conventional converter embodiment.
Figure 2:
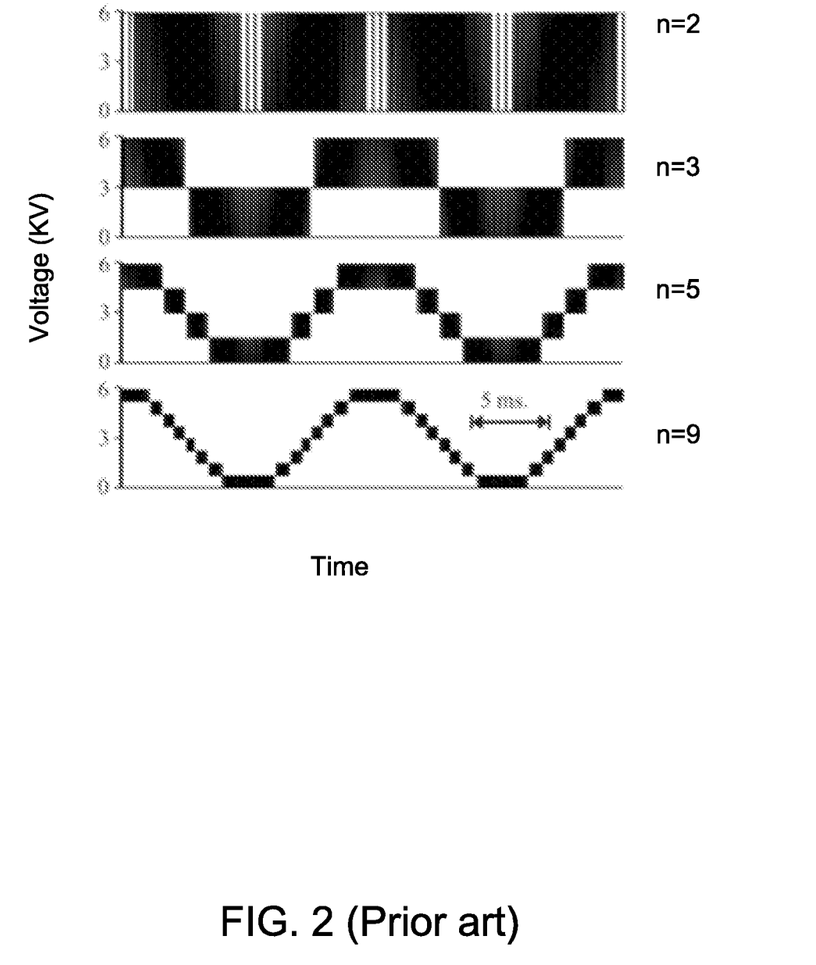
FIG. 2 is a diagram showing inverter line-to-ground voltages for several values of n.

FIG. 1 shows a converter embodiment 10 which will be used to exemplify general multilevel concepts. Although an inverter is used as the basis for this discussion, the multilevel converter can be used in active rectifier, flexible AC transmission systems (FACTS), and other appropriate fields. The converter embodiment 10 includes a multilevel converter (inverter) 12, an AC load 14, a pulse-width modulation (PWM) signal generator 16, and a filter circuit 13 including inductors L, capacitors C, and resistors R. The converter 12 is used to convert the DC signals to AC signals according to the PWM control signals from the PWM signal generator 16. FIG. 2 shows inverter line-to-ground voltages for several values of n (herein, n is used to represent the number of voltage levels). According to the modulation process, the output of the converter 12 is an ideal sine-wave with switching harmonics. Increasing the voltage levels and modulating the multi-level signals with a PWM function results in a converter output voltage that more closely tracks the ideal sinusoidal output by reducing the undesired harmonics.

Figure 3:
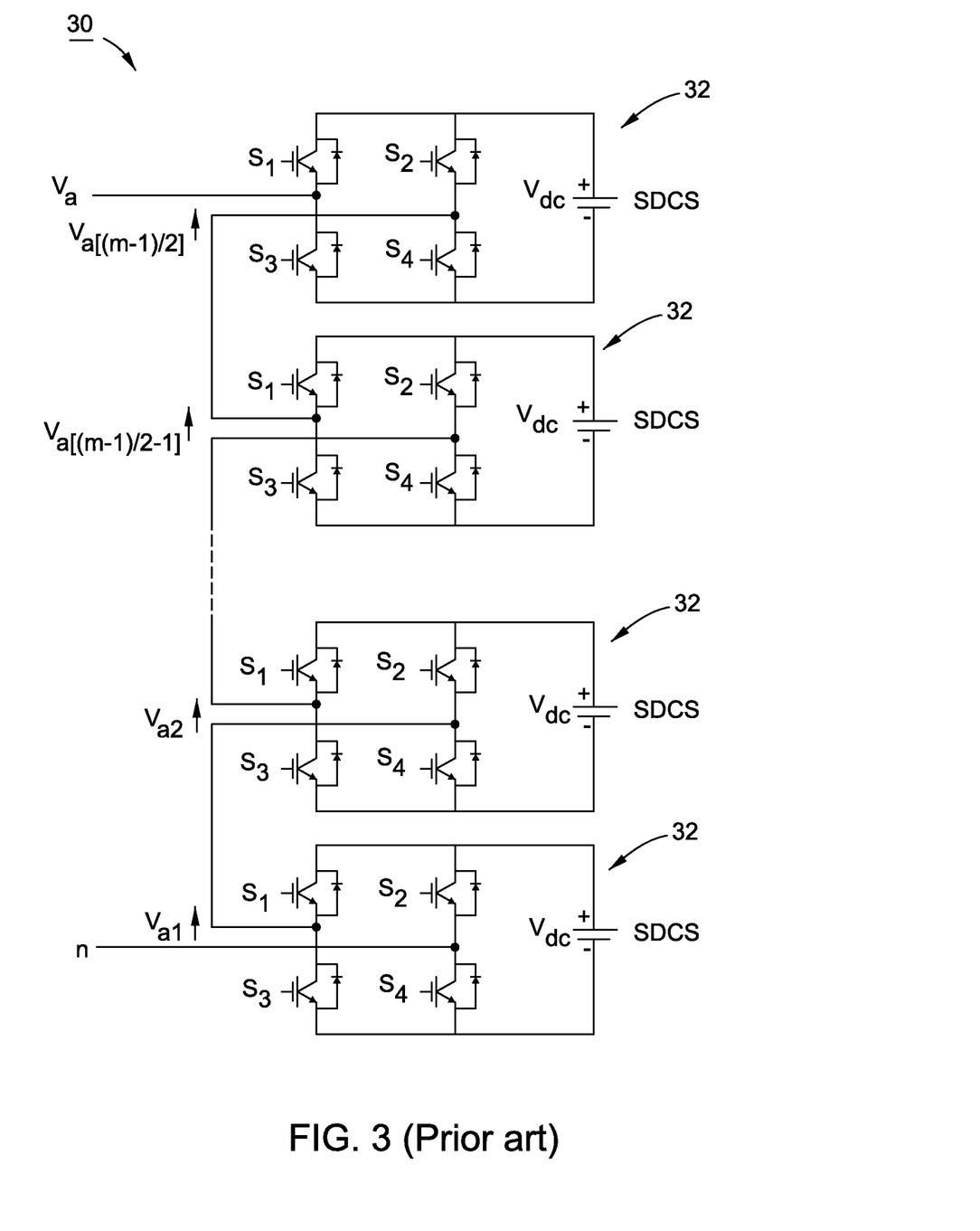
FIG. 3 is a schematic circuit diagram of a phase of a conventional cascaded H-bridge converter topology.

For achieving the conversion function of DC to AC (or AC to DC), some topology configurations of the power source converter are designed accordingly. One classic topology configuration of the power source converter is a cascaded H-bridge converter topology. FIG. 3 shows a phase of a classic cascaded H-bridge converter topology 30. The converter topology 30 is a single-phase structure of an m-level cascaded inverter. Each separate and electrically isolated DC source (SDCS) is connected to a single-phase two-leg full-bridge, or H-bridge inverter 32. Each H-bridge inverter 32 (inverter level) can generate three different voltage outputs, $+V_{dc}$, 0, and $-V_{dc}$ by connecting the DC source to the AC output by different combinations of the four switches $S_1$, $S_2$, $S_3$, and $S_4$. To obtain $+V_{dc}$, switches $S_1$ and $S_4$ are turned on, whereas $-V_{dc}$ can be obtained by turning on switches $S_2$ and $S_3$. By turning on $S_1$ and $S_2$ or $S_3$ and $S_4$, the output voltage is 0. The AC outputs of each of the different full-bridge inverter levels 32 are connected in series such that at any instant the synthesized voltage waveform is the sum of the inverter outputs. The number of output phase voltage levels m in a cascaded inverter is defined by $m=2s+1$, where s is the number of SDCSs. Even though the cascaded H-bridge converter topology 30 is successful in converting DC to AC (or AC to DC), this topology may become bulky and costly when the number of levels exceeds three, due to the large number of both active and passive components present in the circuits.

Therefore, it is desirable to provide a new multilevel power source converter topology configuration to at least reduce the number of the active components making it more economical, while maintaining a high efficiency and generating waveforms of high quality.

BRIEF DESCRIPTION

In accordance with one embodiment disclosed herein, a multilevel converter is provided. Each phase of the multilevel converter includes several cascaded basic units each including a first switching element, a second switching element, and a separate and electrically isolated DC source (SDCS). The SDCS is electrically coupled between the first switching element and the second switching element in each basic unit. Each of the adjacent pairs of the basic units are electrically crosswise coupled together by electrical coupling of the first switching element of a first basic unit of the two adjacent basic units to the second switching element of a second basic unit of the two adjacent basic units and electrical coupling of the second switching element of the first basic unit to the first switching element of the second basic unit.

In accordance with another embodiment disclosed herein, a topology method for configuring each phase of a multilevel converter is provided. The method includes providing several basic units each comprising a first switching element, a second switching element, and an SDCS electrically coupled the SDCS between the first switching element and the second switching element in each basic unit; and electrically crosswise coupling each of the pairs of the adjacent basic units together by electrical coupling of the first switching element of a first basic unit of the two adjacent basic units to the second switching element of a second basic unit of the two adjacent basic units, and electrically coupling the second switching element of the first basic unit to the first switching element of the second basic unit.

In accordance with yet another embodiment disclosed herein, a wind power generation system is provided. The wind power generation system includes several wind turbines and a multilevel converter. Each wind turbine includes a rotor, a generator, and a DC-DC converter. The multilevel converter includes at least one phase. Each phase includes several cascaded basic units each including a first switching element and a second switching element and each coupled to a separate DC-DC converter of the wind power generation system. The DC-DC converter is electrically coupled between the first switching element and the second switching element in each basic unit. Each of the adjacent pairs of the basic units are electrically crosswise coupled together by electrical coupling of the first switching element of a first basic unit of the two adjacent basic units to the second switching element of a second basic unit of the two adjacent basic units and electrical coupling of the second switching element of the first basic unit to the first switching element of the second basic unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments disclosed herein relate generally to power conversion systems with improved and simplified topology configurations. For purposes of illustration, embodiments described herein are based on multilevel voltage source converter (VSC) control systems which can provide multilevel voltage outputs by controlling switching elements in the voltage source converter and use less switching elements while still maintaining high efficiency and generating waveforms of high quality.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean any one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or reactive and are connected or otherwise coupled together (e.g., as one or more integrated circuit chips) to provide the described function.

Figure 4:
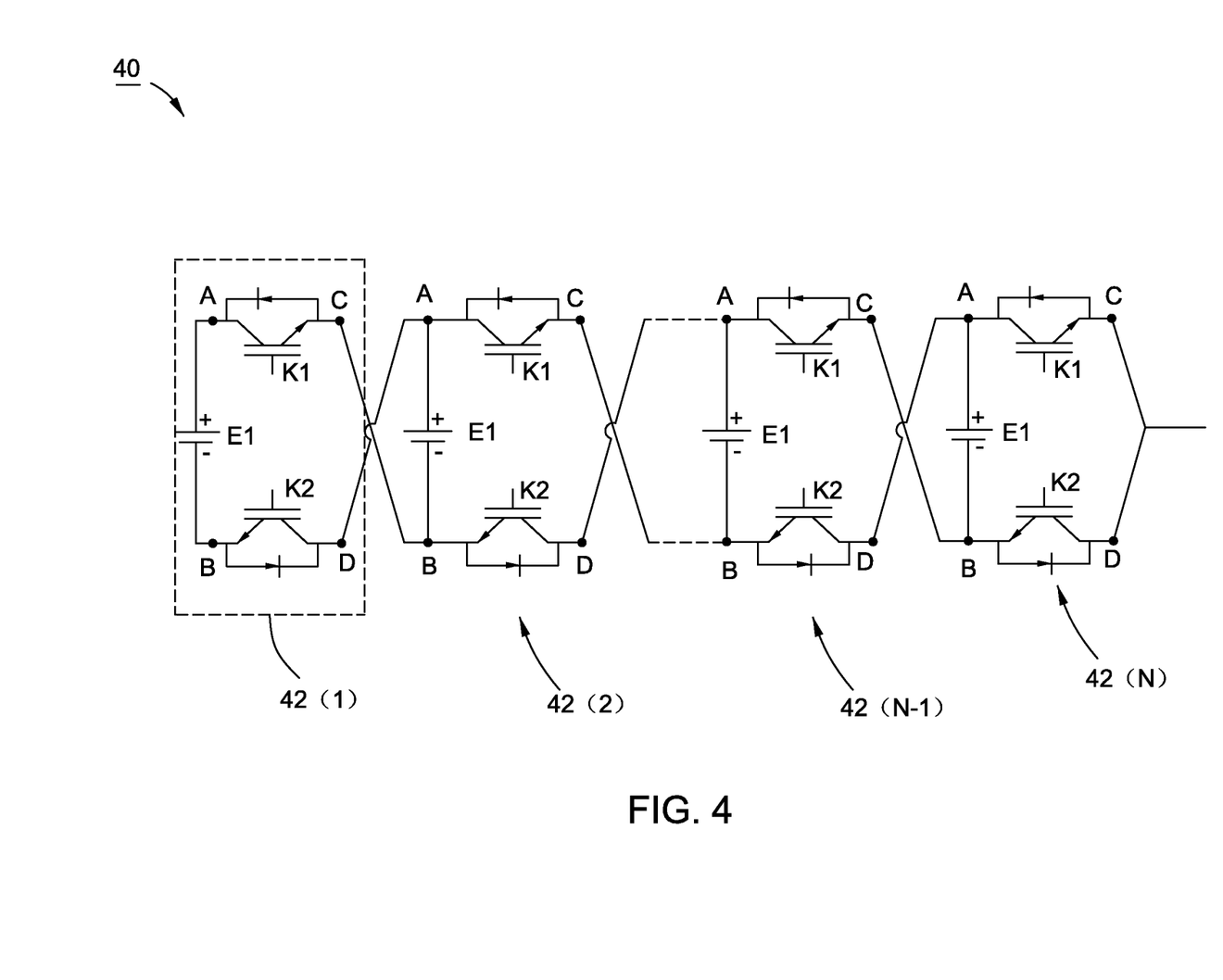
FIG. 4 is a circuit diagram of a phase of a multilevel converter in accordance with one embodiment disclosed herein.

FIG. 4 shows a circuit diagram of a phase (also called leg) of a multilevel converter 40 in accordance with one embodiment. The phase of the converter 40 includes multiple cascaded basic units 42, also marked as 42(1), 42(2) ... 42(N-1), and 42(N). Each basic unit 42 includes a separate and electrically isolated DC source (SDCS) E1 (such as a DC link directly or indirectly coupled to a wind turbine generator, a battery, an isolated power supply, a photovoltaic array, or the like), a first switching element K1, and a second switching element K2. The SDCS E1 of a first basic unit 42(1) is electrically coupled between one terminal A of the first switching element K1 and one terminal B of the second switching element K2 of the first basic unit 42(1). The other terminal C of the first switching element K1 of the first basic unit 42(1) is electrically coupled to one terminal B of the second switching element K2 of a second basic unit 42(2). The other terminal D of the second switching element K2 of the first basic unit 42(1) is electrically coupled to one terminal A of the first switching element K1 of the second basic unit 42(2). Similarly, the second basic unit 42(2) has the same connection relationship with a third basic unit 42(3) as the connection relationship between the first basic unit 42(1) and the second basic unit 42(2), and the subsequent basic units 42(4), 42(5) ... 42(N) are connected in this manner as well. Thus a cascaded multilevel converter 40 is configured according to the above cascaded connection topology mode. The number N of the basic units 42 can be adjusted according to different requirements.

Figure 5:
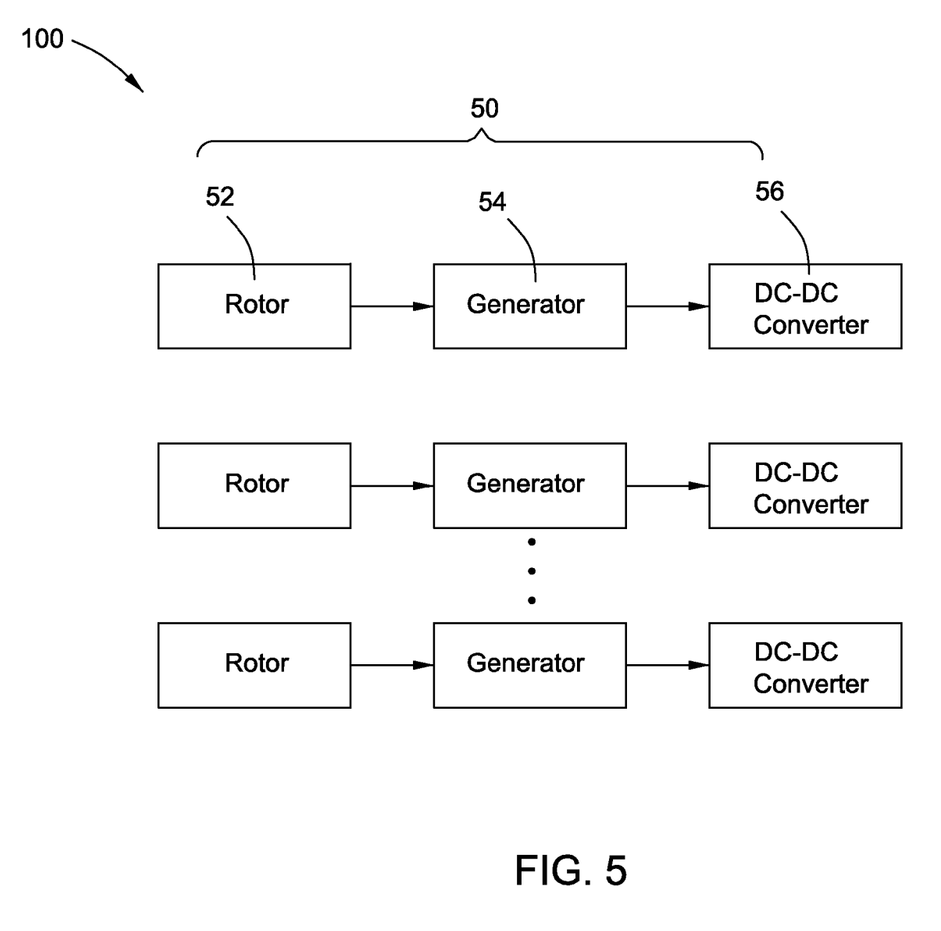
FIG. 5 is a schematic diagram of a detailed implementation for the SDCSs of the multilevel converter of FIG. 4 used in a wind power generation system.

Referring to FIG. 5, a detailed implementation for the SDCSs E1 of the multilevel converter 40 used in a wind power generation system 100 is shown. The wind power generation system 100 includes multiple wind turbines 50 used to generate DC power to be converted to AC power through the multilevel converter 40. For ease of illustration, FIG. 5 shows a portion but not the entirety of the wind power. Each wind turbine 50 may include a rotor 52, a generator 54, and a DC-DC converter 56. In one embodiment, the separate DC-DC converters 56 respectively act as the SDCSs E1 of the multilevel converter 40. In other embodiments, the SDCSs E1 of the multilevel converter 40 also can be used in other kind of power generation systems, such as solar power generation systems, for example.

With continued reference to FIG. 4, in one embodiment, the switching elements K1 and K2 comprise isolated gate bipolar transistors (IGBTs). A parasitic diode, implicitly present due to the nature of IGBTs, is illustrated to indicate the direction of bias of the transistors, namely reverse bias, such that the transistors behave as switches and not as short circuits. While the drawings illustrate the switching elements as IGBTs, it should be noted that other types of switching elements are possible, such as relays, bipolar junction transistors (BJTs), and MOSFETS, for example.

Figure 6:
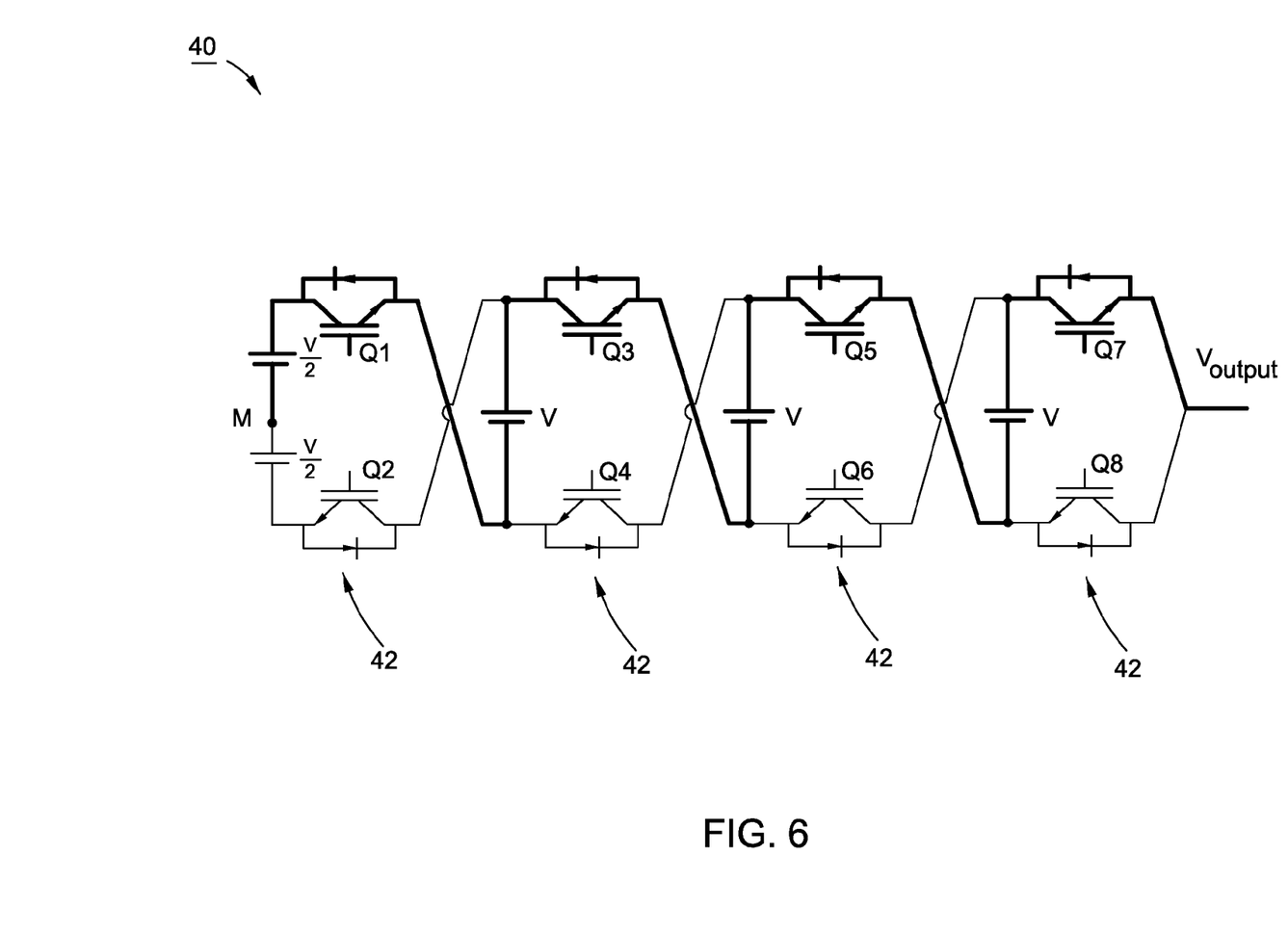
FIG. 6 is a circuit diagram of one particular embodiment of FIG. 4.

When the number of the basic units 42 is N, the number of output phase voltage levels of a phase of the multilevel converter 40 may be 2N by switching different combinations of all of the switching elements K1 and K2. For example, FIG. 6 shows a particular embodiment when the number N of the basic units 42 is equal to four. For purposes of illustration, the switching elements of the four basic units 42 are labeled as Q1-Q8, respectively. Each SDCS E1 provides a V volt voltage which is referenced as V in FIG. 6. A virtual midpoint M of the SDCS E1 of the first basic unit 42(1) is defined, and the corresponding SDCS E1 is separated into two equal pieces with each providing V/2 volt voltage. The output voltage of the multilevel converter 40 corresponding to the virtual midpoint M is labeled as $V_{output}$. The following table shows the output voltage $V_{output}$ of the multilevel converter 40 based on different combinations of the switching elements Q1-Q8 wherein 1 indicates a switch being conducting and 0 indicates a switch being non-conducting.

| Q1 | Q2 | Q3 | Q4 | Q5 | Q6 | Q7 | Q8 | $V_{output}$ |
|----|----|----|----|----|----|----|----|--------------|
| 1  | 0  | 1  | 0  | 1  | 0  | 1  | 0  | +3.5 V |
| 1  | 0  | 1  | 0  | 1  | 0  | 0  | 1  | +2.5 V |
| 1  | 0  | 0  | 1  | 1  | 0  | 1  | 0  | +1.5 V |
| 1  | 0  | 0  | 1  | 1  | 0  | 0  | 1  | +0.5 V |
| 0  | 1  | 1  | 0  | 0  | 1  | 1  | 0  | −0.5 V |
| 0  | 1  | 1  | 0  | 0  | 1  | 0  | 1  | −1.5 V |
| 0  | 1  | 0  | 1  | 0  | 1  | 1  | 0  | −2.5 V |
| 0  | 1  | 0  | 1  | 0  | 1  | 0  | 1  | −3.5 V |

According to above table, the output voltage $V_{output}$ of the multilevel converter 40 can be output in eight levels (+3.5V, +2.5V, +1.5V, +0.5V, −0.5V, −1.5V, −2.5V, −3.5V). For example, when the switching elements Q1, Q3, Q5, Q7 are turned on, and the switching elements Q2, Q4, Q6, Q8 are turned off, following a path through the switching elements the output voltage V output is equal to (+V/2)+(+V)+(+V)+(+V)=+3.5V (see the bold path in FIG. 6). The other levels may be calculated in a similar manner.

According to above analysis, a phase of the multilevel converter 40 can provide arbitrary bipolar voltage and current waveforms of voltage from zero to the sum of the voltages of the set of SDCSs E1 by switching different combinations of all of the switching elements K1 and K2. In other words, this topology shown in FIG. 4 can deliver arbitrary current and voltages with desired amplitude and direction by selecting appropriate numbers of the basic units 42 and selecting appropriate levels of the SDCSs E1 and the switching elements K1 and K2. Thus, this topology shown in FIG. 4 still maintains a high efficiency and is capable of generating waveforms of high quality as compared with conventional converter topology.

Furthermore, when compared to the conventional cascaded H-bridge converter topology configuration, the voltage source converter 40 requires less switching elements to provide an equal number of voltage levels. The table below illustrates this comparison for an eight level converter as an example.

|                    | Cascade H-bridge | Voltage Source Converter 40 |
|--------------------|------------------|------------------------------|
| SDCS (Supply)      | 4                | 4                            |
| Switching elements | 16               | 8                            |

Therefore, the converter 40 disclosed herein is less expensive and complex as compared with conventional topologies. Furthermore, if redundancy is required for each switching element to increase reliability, the number of the redundant switching elements will also only be half of the redundant switching elements required for the cascade H-bridge topology.

Figure 7:
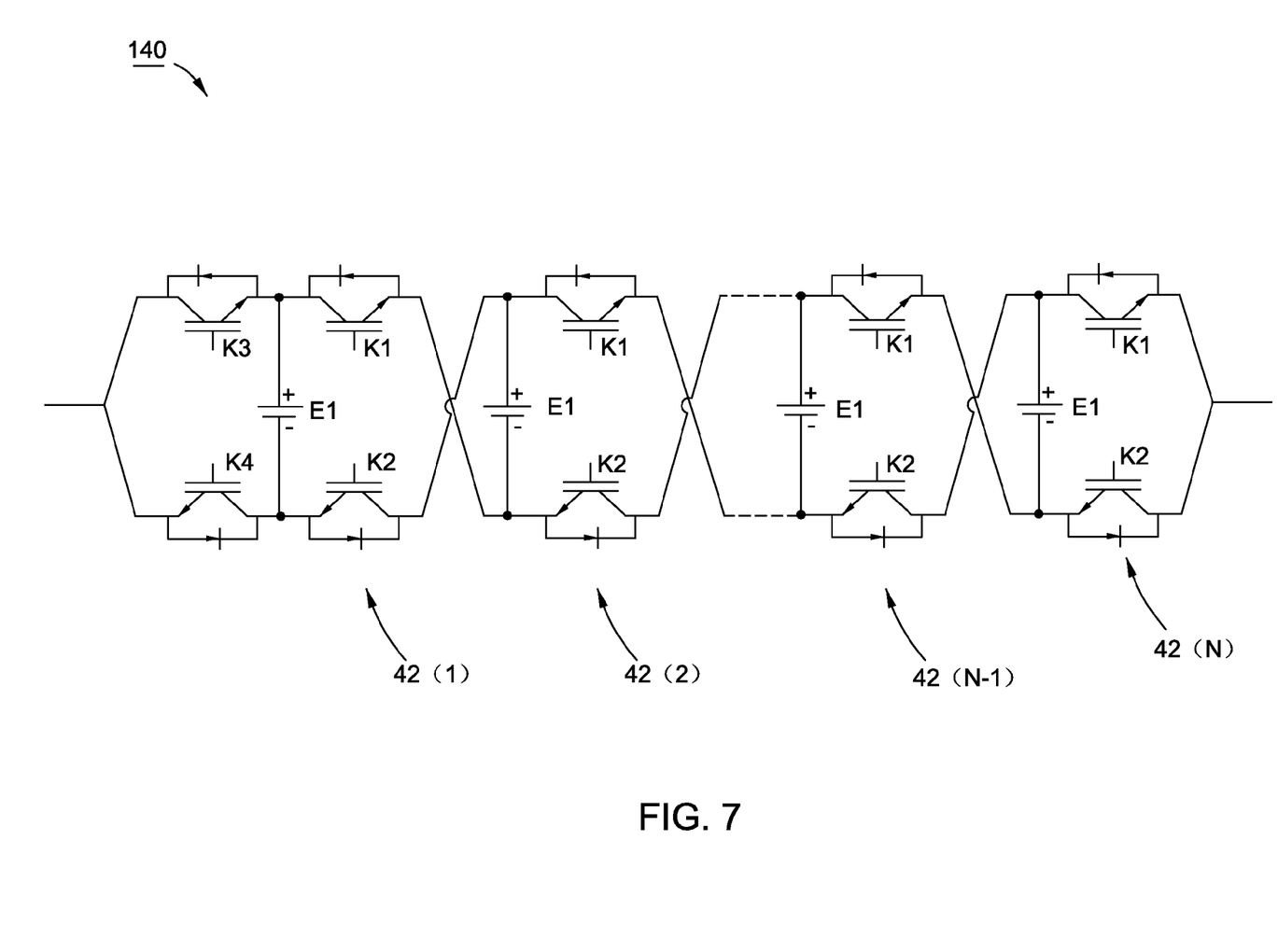
FIG. 7 is a circuit diagram of a phase of a multilevel converter in accordance with another embodiment disclosed herein.

FIG. 7 shows a circuit diagram of a phase of a multilevel converter 140 in accordance with another embodiment. The illustrated embodiment of FIG. 7 includes two switching elements K3 and K4 that are not present in the embodiment of FIG. 4. Switching elements K3 and K4 are used to further increase one voltage level. One terminal of the switching element K3 and one terminal of the switching element K4 are electrically coupled together as an input terminal. The other terminal of the switching element K3 and the other terminal of the switching element K4 are respectively electrically coupled to the two terminals of the SDCS E1 of the first (initial) basic unit 42(1). The number of output phase voltage levels M in this embodiment of FIG. 7 is defined by M=2N+1, where N is the number of the basic units 42 (also the number of SDCSs E1).

For the embodiment of FIG. 7, the multilevel converter 40 can output the same voltage levels as the conventional cascaded H-bridge topology when they have the same number of the SDCSs. However, the total number of the switching elements in the embodiment of FIG. 7 still much less than the cascaded H-bridge topology. Especially, when the number of the voltage levels is very high, the number of the switching elements of the embodiment of FIG. 7 is almost the half of the number of the switching elements of the same level cascaded H-bridge topology. The table below illustrates this comparison for a nine level converter as an example.

|                    | Cascade H-bridge | Voltage source converter 140 |
|--------------------|------------------|-------------------------------|
| SDCS (Supply)      | 4                | 4                             |
| Switching elements | 16               | 10                            |

In one embodiment, the described topology in FIGS. 4 and 7 could be a part of a three phase converter and be connected in delta or in star, for example. In some embodiments, SDCS E1 of different voltages may be used. The multilevel converter 40, 140 is expected to be particularly useful in renewable power generation systems such as wind and solar power generation systems. The multilevel converter 40, 140 could also find use in high voltage, high frequency power supplies such as the supplies used to feed the gradient amplifiers for Magnetic Resonance Imaging (MRI) instruments wherein one phase may be used to generate the complicated current waveforms.

Although specific features of various embodiments of the invention may be shown in and/or described with respect to some drawings and not in others, this is for convenience only. It is to be understood that the described features, structures, and/or characteristics may be combined in any suitable manner in the various embodiments. Additionally, while the invention has been described with reference to exemplary embodiments, it will be understood by those skilled in the art that various changes may be made and equivalents may be substituted for elements thereof without departing from the scope of the invention. In additional, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A multilevel converter comprising at least one phase, each phase comprising:
   a plurality of cascaded basic units each comprising a separate DC source (SDCS) and exactly two switching elements, wherein the exactly two switching elements comprise first and second switching elements;
   wherein the SDCS is electrically coupled between the first switching element and the second switching element in each basic unit;
   wherein each of the adjacent pairs of the basic units are electrically crosswise coupled together by electrical coupling of the first switching element of a first basic unit of the two adjacent basic units to the second switching element of a second basic unit of the two adjacent basic units and electrical coupling of the second switching element of the first basic unit to the first switching element of the second basic unit.

2. The multilevel converter of claim 1, wherein each phase further comprises two additional switching elements, each of the two additional switching elements respectively electrically coupled at a point of connection of the SDCS and one of the first switching elements and the second switching elements of an initial basic unit.

3. The multilevel converter of claim 1, wherein the first and second switching elements comprise transistors with parasitic diodes that are reverse biased.

4. The multilevel converter of claim 3, wherein the transistors comprise insulated gate bipolar translators.

5. The multilevel converter of claim 1, wherein the multilevel converter is embodied in a wind power generation system.

6. The multilevel converter of claim 1, wherein the SDCS comprises a battery, an isolated power supply, or a photovoltaic array.

7. A topology method for configuring each phase of a multilevel converter, the method comprising:
- providing a plurality of cascaded basic units each comprising a separate DC source (SDCS) and exactly two switching elements, wherein the exactly two switching elements comprise first and second switching elements, and wherein the SDCS is electrically coupled between the first switching element and the second switching element in each basic unit; and
- electrically crosswise coupling each of the pairs of the adjacent basic units together by electrical coupling of the first switching element of a first basic unit of the two adjacent basic units to the second switching element of a second basic unit of the two adjacent basic units, and electrically coupling the second switching element of the first basic unit to the first switching element of the second basic unit.

8. The method of claim 7, further comprising coupling two additional switching elements respectively to the first switching element and the second switching element of an initial basic unit.

9. The method of claim 7, wherein the first and second switching elements comprise transistors with parasitic diodes that are reverse biased.

10. The method of claim 9, wherein the transistors comprise insulated gate bipolar translators.

11. A wind power generation system comprising:
- a plurality of wind turbines, each including a rotor, a generator, and a DC-DC converter; and
- a multilevel converter comprising at least one phase, each phase comprising:
- a plurality of cascaded basic units each comprising exactly two switching units comprising a first switching element and a second switching element and each coupled to a separate DC-DC converter of the wind power generation system;
- wherein the DC-DC converter is electrically coupled between the first switching element and the second switching element in each basic unit;
- wherein each of the adjacent pairs of the basic units are electrically crosswise coupled together by electrical coupling of the first switching element of a first basic unit of the two adjacent basic units to the second switching element of a second basic unit of the two adjacent basic units and electrical coupling of the second switching element of the first basic unit to the first switching element of the second basic unit.

12. The wind power generation system of claim 11, wherein the first and second switching elements comprise transistors with parasitic diodes that are reverse biased.

13. The wind power generation system of claim 12, wherein the transistors comprise insulated gate bipolar translators.

* * * * *